United States Patent [19]

Ishizumi et al.

[11] 3,926,993

[45] Dec. 16, 1975

[54] PROCESS FOR PRODUCTION OF QUINAZOLINE DERIVATIVES

[75] Inventors: Kikuo Ishizumi, Toyonaka; Kazuo Mori, Kobe; Michihiro Yamamoto, Nishinomiya; Masao Koshiba, Amagasaki; Shigeho Inaba, Takarazuka; Hisao Yamamoto, Nishinomiya, all of Japan

[73] Assignee: Sumitomo Chemical Company, Ltd., Osaka, Japan

[22] Filed: Sept. 5, 1973

[21] Appl. No.: 394,542

[30] Foreign Application Priority Data

Sept. 7, 1972 Japan.............................. 47-90225

[52] U.S. Cl..................... 260/251 QB; 260/256.4 Q; 260/256.R; 260/294.8 R; 260/294.8 G; 260/295 AM; 260/332.2 R; 260/345.7; 260/347.2; 260/347.3; 260/516; 260/518 R; 260/518 A; 260/519; 260/562 K; 260/999

[51] Int. Cl.$^2$..................... C07D 239/82
[58] Field of Search.............. 260/251 QB, 256.4 Q, 256.5 R

[56] References Cited
UNITED STATES PATENTS
3,712,892 1/1973 Inaba et al................... 260/251 QB

*Primary Examiner*—Raymond V. Rush
*Attorney, Agent, or Firm*—Stevens, Davis, Miller & Mosher

[57] ABSTRACT

2(1H)-quinazoline derivatives, which are useful as anti-inflammatory, antiviral and uricosuric agents or intermediates for production of other medicines, are prepared by reacting an oxamyl halide derivative sodium azide.

4 Claims, No Drawings

PROCESS FOR PRODUCTION OF QUINAZOLINE DERIVATIVES

This invention relates to a novel process for preparing quinazoline derivatives.

More particularly, this invention relates to a novel process for preparing quinazoline derivatives of the formula,

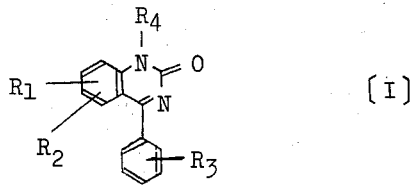

wherein $R_1$, $R_2$ and $R_3$ are independently a hydrogen atom, a halogen atom, a trifluoromethyl group, a nitro group, a lower alkylsulfonyl group, a lower alkyl group, a lower alkoxy group or a lower alkylthio group; and $R_4$ is a hydrogen atom, a lower alkyl group, an aralkyl group, a lower alkanoyloxyalkyl group, a lower alkoxyalkyl group, a polyhaloalkyl group, a cycloalkyl group, a cycloalkylalkyl group, a tetrahydrofurfuryl group, a tetrahydropyranylmethyl group, a pyridylmethyl group, a furylmethyl group or thienylmethyl group.

In the compounds of the above formula [I], the term "halogen" includes all halogen atoms, i.e. fluorine, chlorine, bromine and iodine; the term "alkyl" means both straight and branched chain aliphatic hydrocarbon radicals, and lower alkyl is, for example, $C_{1-4}$ alkyl which includes such groups as methyl, ethyl, n-propyl, isopropyl, n-butyl, isobutyl and tertiarybutyl; the term "lower alkoxy" is, for example, $C_{1-4}$ alkoxy which includes such groups as methoxy, ethoxy, n-propoxy, isopropoxy, n-butoxy and tertiary-butoxy; the term "aralkyl" is, for example, benzyl, phenethyl, phenylpropyl, chlorobenzyl or fluorobenzyl group; the term "lower alkylsulfonyl" is, for example, $C_{1-4}$ alkylsulfonyl which includes such groups as methylsulfonyl, ethylsulfonyl, propylsulfonyl, etc.; the term "lower alkanoyloxyalkyl" is, for example, ($C_{2-3}$ alkanoyloxy)-$C_{1-4}$ alkyl in which the $C_{2-3}$ alkanoyloxy moiety includes such groups as acetoxy and propionyloxy, and the $C_{1-4}$ alkyl moiety is as defined above; the term "lower alkoxyalkyl" is, for example, ($C_{1-4}$ alkoxy)-$C_{1-4}$ alkyl in which both moieties are as defined above; the term "polyhaloalkyl" is, for example, a trichloromethyl, trifluoromethyl, trichloroethyl, trifluoroethyl or pentafluoropropyl group; the term "cycloalkyl" is, for example, $C_{3-6}$ cycloalkyl which includes such groups as cyclopropyl, cyclobutyl, cyclopentyl, cyclohexyl, methylcyclopropyl, dimethylcyclopropyl, etc.; the term "cycloalkylalkyl" is, for example, ($C_{3-6}$ cycloalkyl)-$C_{1-4}$ alkyl in which both moieties are as defined above; and the term "alkylthio" is, for example, $C_{1-4}$ alkylthio which includes such groups as methylthio, ethylthio, propylthio and butylthio.

The well-known process for preparing the quinazolinone derivatives represented by the formula [I] above comprises a condensation reaction of an o-aminobenzophenone derivative represented by the formula [II]

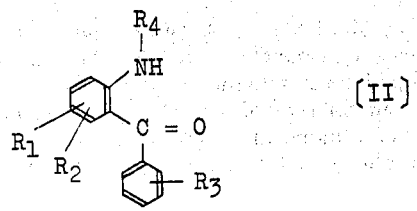

wherein $R_1$, $R_2$, $R_3$ and $R_4$ are as defined above, with, for example, an alkylcarbamate. However, the above known process is not advantageous in that the condensation reaction requires a heating at a high temperature (160° – 200°C) in the presence of a catalyst such as zinc chloride and treatments subsequent to the condensation reaction are very cumbersome and difficult to conduct.

It is an object of this invention to provide a novel process for preparing a quinazoline derivative of the formula [I] using a novel oxamyl halide derivative which can be easily obtained from an o-aminobenzophenone derivative. It is further object of the present invention to provide a novel process for preparing a quinazolinone derivative of the formula [I] under mild reaction conditions overcoming many disadvantages of the direct condensation reaction of an o-aminobenzophenone derivative. Further objects and advantages of the present invention will be apparent to one skilled in the art from the accompanying disclosure and discussion.

In accordance with the process of the present invention, a quinazoline derivative of the formula [I] is prepared by reacting an oxamyl halide derivative of the formula,

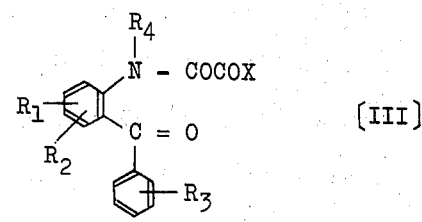

wherein $R_1$, $R_2$, $R_3$ and $R_4$ are as defined above; and X is a halogen atom, with sodium azide.

The oxamyl halide derivative of the formula [III], which is a novel compound, can easily be prepared by reacting a corresponding 2-aminobenzophenone derivative with an oxalyl halide at room temperature.

In the embodiment of the present invention, the oxamyl halide derivative of the formula [III] is treated with sodium azide which is preferably used as an aqueous solution.

The reaction of the present invention is preferably carried out in the presence of a solvent. As the solvent, alcohols such as methanol, ethanol, propanol, etc., water, chloroform, acetone, dioxane, tetrahydrofuran or a mixture thereof are preferable.

The reaction can easily be proceeded under cooling, but, if desired, it can be proceeded at the reflux temperature of a solvent used.

In the reaction of the present invention, intermediate precursors of the quinazoline derivative of the formula [I] or a mixture of the precursors and the quinazoline derivative of the formula [I] may be obtained depending on the reaction conditions employed. These precursors can easily be converted quantitatively to the quinazoline derivative of the formula [I] by heating. The conversion reaction may be proceeded without using a solvent, but, if desired, it can be proceeded using an organic solvent such as an alcohol, e.g. methanol, ethanol or the like, an aromatic hydrocarbon, e.g. benzene, toluene, xylene or the like, acetone, ether, tetrahydrofuran or the like.

The quinazoline derivatives of the formula [I] obtained by the process of the present invention are useful as excellent anti-inflammatory, antiviral and uricosuric agents with low toxicities and they are also useful as intermediates for preparing other excellent anti-inflammatory agents and central nervous system depressants.

According to the process of the present invention, the following quinazoline derivatives, for example, can be obtained.

4-Phenyl-2(1H)-quinazolinone, m.p. 251° – 252°C
4-Phenyl-6-chloro-2(1H)-quinazolinone, m.p. > 300°C
4-Phenyl-6-fluoro-2(1H)-quinazolinone, m.p. > 300°C
4-Phenyl-6-methyl-2(1H)-quinazolinone, m.p. > 290°C
4-Phenyl-6-methoxy-2(1H)-quinazolinone, m.p. 287°C
4-Phenyl-6-nitro-2(1H)-quinazolinone, m.p. > 300°C
4-Phenyl-6-trifluoromethyl-2-(1H)-quinazolinone, m.p. 299°C
1-Methyl-4-phenyl-6,7-dimethoxy-2(1H)-quinazolinone, m.p. 197° – 198°C
4-(o-Chlorophenyl)-6-nitro-2(1H)-quinazolinone, m.p. > 300°C
4-(o-Fluorophenyl)-6-chloro-2(1H)-quinazolinone, m.p. > 300°C
1-Methyl-4-phenyl-2(1H)-quinazolinone, m.p. 142° – 143°C
1-Methyl-4-phenyl-6-chloro-2(1H)-quinazolinone, m.p. 220° – 221°C
1-Methyl-4-phenyl-6-iodo-2(1H)-quinazolinone, m.p. 247° – 248°C
1-Methyl-4-phenyl-6-methoxy-2(1H)-quinazolinone, m.p. 166°C
1-Methyl-4-phenyl-6-nitro-2(1H)-quinazolinone, m.p. 259° – 264°C
1,6-Dimethyl-4-phenyl-2(1H)-quinazolinone, m.p. 150°C
1-Ethyl-4-phenyl-6-nitro-2(1H)-quinazolinone, m.p. 176° – 178°C
1-Ethyl-4-(o-tolyl)-6-chloro-2(1H)-quinazolinone, m.p. 138° – 139°C
1-Isopropyl-4-phenyl-7-methyl-2(1H)-quinazolinone, m.p. 140°C
1-Isopropyl-4-phenyl-7-methoxy-2(1H)-quinazolinone, m.p. 137° – 138°C
1-Isopropyl-4-phenyl-6-nitro-2(1H)-quinazolinone, m.p. 194° – 195°C
1-Isobutyl-4-phenyl-6-chloro-2(1H)-quinazolinone, m.p. 138° – 139°C
1-(2,2,2-Trifluoroethyl)-4-phenyl-6-chloro-2(1H)-quinazolinone, m.p. 185° – 186°C
1-(2,2,3,3,3-Pentafluoropropyl)-4-phenyl-6-methyl-2(1H)-quinazolinone, m.p. 175.5° – 176.5°C
1-Benzyl-4-phenyl-6-nitro-2(1H)-quinazolinone, m.p. 173° – 174°C
1-Acetoxyethyl-4-phenyl-6-chloro-2(1H)-quinazolinone, m.p. 139° – 140°C
1-Acetoxyethyl-4-phenyl-6-nitro-2(1H)-quinazolinone, m.p. 158° – 159°C
1-(2-Ethoxyethyl)-4-phenyl-6-nitro-2(1H)-quinazolinone, m.p. 128° – 129°C
1-Cyclohexyl-4-phenyl-6-nitro-2(1H)-quinazolinone, m.p. 186° – 187°C
1-Cyclopropylmethyl-4-phenyl-6-chlor-2(1H)-quinazolinone, m.p. 174° – 175°C
1-Cyclopropylmethyl-4-phenyl-6-nitro-2(1H)-quinazolinone, m.p. 172° – 173°C
1-Cyclopropylmethyl-4-phenyl-6-trifluoromethyl-2(1H)-quinazolinone, m.p. 166° – 167°C
1-Cyclopropylmethyl-4-phenyl-6-methylsulfonyl-2(1H)-quinazolinone, m.p. 186° – 187°C
1-Cyclopropylmethyl-4-phenyl-6-bromo-2(1H)-quinazolinone, m.p. 163° – 164°C
1-Cyclopropylmethyl-4-phenyl-6,8-dichloro-2(1H)-quinazolinone, m.p. 158° – 159°C
1-Cyclopropylmethyl-4-phenyl-6-methoxy-2(1H)-quinazolinone, m.p. 115° – 116°C
1-Cyclopropylmethyl-4-(o-fluorophenyl)-6-chloro-2(1H)-quinazolinone, m.p. 171° – 172°C
1-Cyclopropylmethyl-4-phenyl-6-methylthio-2(1H)-quinazolinone, m.p. 159° – 160°C
1-Cyclohexylethyl-4-phenyl-6-chloro-2(1H)-quinazolinone, m.p. 115° – 116°C
1-Cyclopropylmethyl-4-(o-chlorophenyl)-6-nitro-2(1H)-quinazolinone, m.p. 165° – 166°C
1-Cyclopentylmethyl-4-phenyl-6-nitro-2(1H)-quinazolinone, m.p. 200° – 201°C
1-Cyclohexylmethyl-4-phenyl-6-nitro-2(1H)-quinazolinone, m.p. 201° – 202°C
1-Tetrahydrofurfuryl-4-phenyl-6-nitro-2(1H)-quinazolinone, m.p. 149° – 150°C
1-(2-Tetrahydropyranylmethyl)-4-phenyl-6-nitro-2(1H)-quinazolinone, m.p. 185° – 186°C
1-(2-Pyridylmethyl)-4-phenyl-6-nitro-2(1H)-quinazolinone, m.p. 175° – 176°C
1-(2-Furylmethyl)-4-phenyl-6-nitro-2(1H)-quinazolinone, m.p. 190° – 190.5°C
1-(2-Thienylmethyl)-4-phenyl-6-nitro-2(1H)-quinazolinone, m.p. 219° – 220°C The invention is illustrated more particularly by way of the following examples but, as will be more apparent, is not limited to the details thereof.

EXAMPLE 1

2-Methylamino-5-chlorobenzophenone (2.0 g) with 5.0 g of oxalyl chloride was stirred at room temperature for 2 hours. After removing the excess oxalyl chloride by distillation under reduced pressure, the obtained oxamyl chloride derivative was dissolved in 30 ml of acetone and 4 ml of an aqueous solution containing 1.2 g of sodium azide was added thereto with stirring under cooling. The mixture was stirred under cooling further 2 hours. Then, deposited crystals were collected by filtration, washed with successive, water and acetone containing water to give 1.81 g of the crystals. On heating the crystals, decomposition was recognized at 125° – 128°C without melting and they melted at 216° – 220°C. Analysis by thin layer chromatography (silica gel and ethyl acetate) revealed that the crystals were a mixture of 1-methyl-4-phenyl-6-chloro-2(1H)-quinazolinone and its precursor.

Infrared absorption spectrum (Nujol): 3270, 1643 cm$^{-1}$

From the filtrate, there were obtained additional crystals of 1-methyl-4-phenyl-6-chloro-2(1H)-quinazolinone having a melting point of 223° – 224.5°C.

The mixture of 1-methyl-4-phenyl-6-chloro-2(1H)-quinazolinone and its precursor was suspended in 20 ml of toluene and the suspension was refluxed for 2 hours and 20 minutes. After cooling, deposited crystals were collected by filtration to give 1.52 g of 1-methyl-4-phenyl-6-chloro-2(1H)-quinazolinone having a melting point of 221° – 223°C.

EXAMPLE 2

2-Methylamino-5-chlorobenzophenone (2.0 g) with 5.0 g of oxalyl chloride was stirred at room temperature for 2 hours. After removing the excess oxalyl chloride by distillation under reduced pressure, the obtained oxamyl chloride derivative was dissolved in 30 ml of acetone and 4 ml of an aqueous solution containing 1.2 g of sodium azide was added thereto with stirring under cooling. After stirring for further 1 hour under cooling, 50 ml of ice water was added to the reaction mixture to separate oily matter. After stirring the mixture for 1 hour, the oily matter became rubber-like matter. The rubber-like matter was separated and washed with water to become crystals with evolving heat. The crystals were collected by filtration and washed with water to give 1.47 g of 1-methyl-4-phenyl-6-chloro-2(1H)-quinazolinone having a melting point of 218° – 223°C. From the filtrate, there were obtained additional 0.8 g of crystals of 1-methyl-4-phenyl-6-chloro-2(1H)-quinazolinone having a melting point of 221° – 223°C.

EXAMPLE 3

2-Methylamino-5-nitrobenzophenone (2.0 g) with 5.0 g of oxalyl chloride was stirred at room temperature for 2 hours. After removing the excess oxalyl chloride by distillation under reduced pressure, the obtained oxamyl chloride derivative was dissolved in 30 ml of acetone and 4 ml of an aqueous solution containing 1.2 of sodium azide was added thereto with stirring under cooling. After stirring for further 1.5 hours under cooling, 50 ml of ice water was added to the reaction mixture. Deposited crystals were collected by filtration and washed with water to give 1.43 g of 1-methyl-4-phenyl-6-nitro-2(1H)-quinazolinone having a melting point of 259° – 264°C. From the filtrate, there were obtained additional 0.11 g of crystals of 1-methyl-4-phenyl-6-nitro-2(1H)-quinazolinone having a melting point of 255° – 264°C.

EXAMPLE 4

2-(2-Acetoxyethyl)amino-5-nitrobenzophenone (1.5 g) with 2.9 g of oxalyl chloride was stirred at room temperature for 1 hour. After removing the excess oxalyl chloride by distillation under reduced pressure, the obtained oxamyl chloride derivative was dissolved in 20 ml of acetone and 4 ml of an aqueous solution containing 0.7 g of sodium azide was added thereto with stirring under cooling. After stirring for 0.5 hours under cooling and for 3.5 hours at room temperature, 4 ml of an aqueous solution containing 0.7 g of sodium azide was added to the reaction mixture and stirring was continued for 1 hour at 50°C. The organic layer was separated and the water layer was extracted with ether. The organic layers were combined, washed with a saline solution, and dried over anhydrous sodium sulfate and the solvent was removed by distillation under reduced pressure. The residue was treated with ether to give 1.36 g of crystals of 1-(2-acetoxyethyl)-4-phenyl-6-nitro-2(1H)-quinazolinone having a melting point of 148° – 155°C. Recrystallization from an alcohol gave crystals having a melting point of 154° – 155°C.

EXAMPLE 5

Using a similar procedure to that described in Example 2, 1.7 g of 1-cyclopropylmethyl-4-phenyl-6-chloro-2(1H)-quinazolinone having a melting point of 175° – 176°C was obtained from 2.0 g of 2-cyclopropylmethylamino-5-chlorobenzophenone.

What is claimed is:

1. A process for preparing a quinazolinone of the formula,

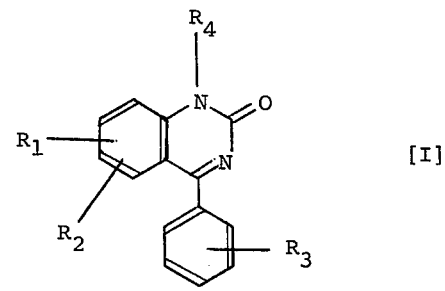

[I]

wherein $R_1$, $R_2$ and $R_3$ are independently hydrogen, halogen, trifluoromethyl, nitro, lower alkylsulfonyl, lower alkyl, lower alkoxy or lower alkylthio; and $R_4$ is hydrogen, lower alkyl, phenyl $C_1$-$C_3$ alkyl, chlorobenzyl, fluorobenzyl, ($C_2$-$C_3$ alkanoyl) -$C_1$-$C_4$ alkyl, ($C_1$-$C_4$ alkoxy)$C_1$-$C_4$ alkyl, polyhalo $C_1$-$C_3$ alkyl, $C_3$-$C_6$ cycloalkyl, ($C_3$-$C_6$ cycloalkyl)$C_1$-$C_4$ alkyl, tetrahydrofurfuryl, tetrahydropyranylmethyl, pyridylmethyl, furylmethyl or thienylmethyl, which comprises the step of reacting an oxamyl halide of the formula,

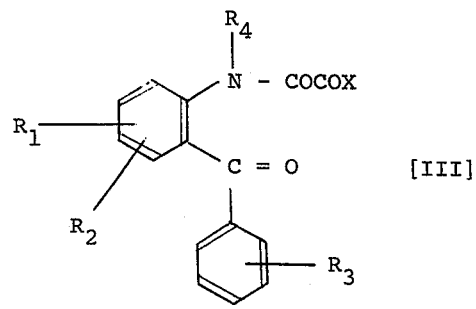

[III]

wherein $R_1$, $R_2$, $R_3$ and $R_4$ are as defined above; and X is a halogen atom, with sodium azide.

2. A process according to claim 1, wherein the reaction of an oxamyl of the formula with sodium azide is carried out in a solvent under cooling or up to the reflux temperature of said solvent.

3. A process according to claim 2, wherein the solvent is methanol, ethanol, propanol, water, chloroform, acetone, dioxane, tetrahydrofuran, or a mixture thereof.

4. A process according to claim 1, wherein sodium azide is used as an aqueous solution.

* * * * *